(12) United States Patent
Unitt et al.

(10) Patent No.: US 7,212,540 B2
(45) Date of Patent: May 1, 2007

(54) TIME SLOT SCHEDULING FOR SHARED-MEDIUM COMMUNICATIONS NETWORKS

(75) Inventors: Brian Unitt, Bishops Stortford (GB); Michael Grant, Bishops Stortford (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1055 days.

(21) Appl. No.: 10/109,918

(22) Filed: Mar. 29, 2002

(65) Prior Publication Data
US 2002/0163695 A1    Nov. 7, 2002

Related U.S. Application Data

(60) Provisional application No. 60/281,894, filed on Apr. 5, 2001.

(51) Int. Cl.
H04J 3/06    (2006.01)
(52) U.S. Cl. .................... 370/452; 370/508; 398/36
(58) Field of Classification Search ............... 370/452, 370/508; 398/36
See application file for complete search history.

(56) References Cited

U.S. PATENT DOCUMENTS 5,452,115 A    9/1995 Tomioka
5,559,805 A    9/1996 Hedderly 6,741,614 B1 *    5/2004 Porter et al. ................. 370/508

FOREIGN PATENT DOCUMENTS

| GB | 2 252 701 A | 8/1992 |
|---|---|---|
| GB | 2 281 161 A | 2/1995 |
| JP | 58-73253 | 5/1983 |
| JP | 64-39850 | 2/1989 |
| JP | 3-108838 | 5/1991 |
| JP | 4-181837 | 6/1992 |

* cited by examiner

Primary Examiner—Melvin Marcelo
(74) Attorney, Agent, or Firm—Barnes & Thornburg

(57) ABSTRACT

A method and apparatus for allocating time slots in a communications network, comprising a headend, a plurality of outstations, and a shared medium connecting each outstation to the headend. The method involves scheduling timeslots for each outstation responsive to the measures of distance of each outstation from the headend. The method reduces the requirement for guard bands between timeslots, since it obviates allocation of a guard band between consecutive first and second timeslots where the outstation allocated the second timeslot is located no closer to the headend than the outstation allocated the first time slot. Ideally, the timeslots are allocated to outstations cyclically in ascending order of distance of the outstations from the headend, with the closest outstation following the farthest to complete the cycle, so that guard bands are rendered unnecessary between the majority of timeslots. In preferred embodiments distance may be round-trip delay, and the outstations and head end may be configured to form a ring network.

25 Claims, 4 Drawing Sheets

TIME SLOT SCHEDULING FOR SHARED-MEDIUM COMMUNICATIONS NETWORKS

RELATED APPLICATIONS

This is the non-provisional filing of U.S. Provisional Application No. 60/281,894 filed on Apr. 5, 2001.

FIELD OF THE INVENTION

The present invention relates to a method and apparatus for scheduling time slots in a shared medium, or point-to-multipoint, communications network and a system incorporating the same.

BACKGROUND TO THE INVENTION

In a Passive Optical Network (PON) which relies on including a guard band between upstream transmissions from each outstation, the size of the guard band is related to the differential distance between the outstations. Assuming no measurement of the relative geographic distances from the head end to each of the outstations is made, the guard band increases according to the differential distance at around 10 microseconds per kilometer distance. For example, on a PON covering a 10 km distance with 32 outstations, 3200 microseconds must be allowed for guard band when interrogating all outstations. To maintain an upstream efficiency of 80%, the total active transmission time for all outstations then amounts to 12800 (4×3200) microseconds and the total time to interrogate all outstations is 16 milliseconds.

One problem arising from this is that many telecommunications services require a bounded transmission delay, typically no more than a few milliseconds for any given network element. A delay contribution of 16 milliseconds is therefore unacceptable. In many cases efficiency falls significantly as the total interrogation time is reduced.

The simplest known form of Gigabit Ethernet PON (GE-PON) dispenses with ranging or marshalling of outstations and can nevertheless achieve useful performance within a limited set of parameters. One technique is to limit the differential distance from the splitter to each outstation. For example, the splitter may be placed 9 km from the headend, and the outstations all clustered within 1 km of this splitter. In such an arrangement, a GEPON with 80% upstream bandwidth efficiency for a 16-way split, a 1 km differential distance between outstations and a 4 ms latency can be achieved.

A problem with such an arrangement is that increasing the differential distance or split ratio leads to a reduction in bandwidth efficiency or an unacceptable latency, meaning that such a simple GEPON has limited applicability.

An alternative technique is to use a complex marshalling system, whereby a special messaging protocol is used between the headend and each outstation to measure the timing, and to marshal, or build out, the exact outstation transmit timing in order to reduce the inter-burst guard bands to an acceptable level. Problematically, this marshalling technique requires specialised silicon at both ends of the system. Such a system tends to be proprietary and difficult to standardise because it requires radical changes to long-established Ethernet-MAC designs.

The present invention achieves efficiency close to that of a fully ranged system, but without the need for outstation delay build out.

OBJECT OF THE INVENTION

The invention seeks to provide an improved method and apparatus for scheduling time slots in a shared medium communications network which mitigates one or more problems associated with the prior art.

SUMMARY OF THE INVENTION

According to a first aspect of the present invention there is provided a method of allocating guard bands between time slots in a communications network comprising a headend, a plurality of outstations, and a shared medium connecting each outstation to the headend, the method comprising the steps of: establishing measures of distance of each outstation from the headend; allocating a guard band between successive first and second timeslots allocated to the outstations only where the outstation allocated the second timeslot is closer to the head end than the outstation allocated the first timeslot.

Preferably, the measure of distance is a measure of round-trip delay between headend and outstation.

The method may also comprise the step of scheduling timeslots for the outstations responsive to the measures of distance.

Preferably, the step of scheduling comprises the step of: scheduling the timeslots to outstations cyclically in ascending order of distance of the outstations from the headend.

Preferably, the step of establishing comprises the steps of: for each outstation forming a measure of the time interval between the headend issuing an interrogation and the headend receiving a response from that outstation; for each outstation, forming the measures of the distance responsive to the intervals.

Preferably, the step of establishing comprises the steps of: for each outstation, measuring the intervals between sending at least one interrogation message from the headend to the outstation and receiving respective replies from the outstation; for each outstation, forming the measures of the distance responsive to the respective minima of the intervals.

Preferably, a timeslot is periodically allocated for purposes of re-deriving the measures of distance of each outstation from the headend.

Preferably, the shared medium is one of an optical fibre medium, a copper medium, and a wireless medium.

In one preferred embodiment, the outstations are substantially equidistant from the head end.

In a further preferred embodiment, the shared medium is configured as a loop.

In one preferred embodiment, separate shared media are provided for upstream and downstream communication between the head end and the outstations.

In one preferred embodiment round trip delay between each outstation and the head end is substantially the same, the method comprising the steps of:
scheduling timeslots for each outstation without allocating a guard band between consecutive first and second timeslots.

In a preferred embodiment, the outstations and head end are configured in a ring network, in which differential distance between each outstation and the headend is substantially eliminated by causing both downstream and upstream traffic to travel around the ring in the same direction.

Preferably, the step of providing measures is performed prior to installation of the network.

Preferably, the step of scheduling timeslots comprises the step of scheduling timeslots according to demand.

According to a further aspect of the present invention there is provided a line termination unit for a telecommunication network comprising a plurality of outstations and a shared medium connecting each outstation to the headend, the line termination unit comprising: a guard band allocator arranged to allocate guard bands between successive first and second timeslots allocated to the outstations only where the outstation allocated the second timeslot is closer to the head end then the outstation allocated the first timeslot.

The line termination unit may also comprise a timeslot scheduler arranged to schedule timeslots for each outstation responsive to measures of distance of each outstation from the headend.

The line termination unit may also comprise a ranging system arranged to derive the measures of distance of each outstation from the head end.

In a preferred embodiment, the scheduler is arranged to schedule timeslots to outstations cyclically in ascending order of distance of the outstations from the headend.

The shared medium may be one of an optical (e.g.) medium, a copper medium, and a wireless medium.

The invention is also directed to a communications network, and in particular a communications access network comprising a line termination unit according to the present invention.

The communications network preferably further comprises at least one outstation, the line terminating unit and the at least one outstation being configured to form a ring network.

The communications network may be an optical network.

In a preferred embodiment, wave division multiplexing is employed to separate upstream and downstream traffic.

The invention also provides for apparatus and systems for the purposes of telecommunications which comprises one or more instances of apparatus embodying the methods, together with other additional apparatus.

In particular, according to a further aspect of the present invention there is provided a line termination unit (LTU) for a telecommunication network comprising a plurality of outstations and a shared medium connecting each outstation to the headend, the apparatus comprising: a ranging system arranged to derive measures of distance of each outstation from the headend; a timeslot scheduler arranged to schedule timeslots for each outstation responsive to the measures of distance of each outstation from the headend.

Advantageously, use of a simple ranging protocol greatly reduces the complexity of the system, especially that required in the outstations.

Advantageously, reducing the number of guard bands required between timeslots improves bandwidth utilisation efficiency.

Advantageously, multiple access networks allow the shared medium (for example optical fibre) and exchange end equipment to be shared across groups of end customers, resulting in a more cost effective infrastructure. For example, the present invention allows the efficiency of a PON to be improved without the burden of significant increase in complexity required in a fully ranged shared-access network. This is particularly attractive as the number of outstations connected to a single PON increases. The availability of such a system, which could be included as an optional enhancement to a standard product, is likely to increase the attractiveness of the solution to customers.

The invention is also directed to a program for a computer by which the described apparatus operates and including method steps for carrying out every function of the apparatus.

In particular, according to a further aspect of the present invention there is provided a program for a computer in a machine readable form, for allocating time slots in a communications network, comprising a headend, a plurality of outstations, and a shared medium connecting each outstation to the headend, the program being arranged to perform the steps of: storing measures of distance of each outstation from the headend;

allocating a guard band between successive first and second timeslots allocated to the outstations only where the outstation allocated the second timeslot is closer to the head end than the outstation allocated the first timeslot.

The invention also provides for a program for a computer in a machine readable form, a plurality of outstations, and a shared medium connecting each outstation to the head end, and in which round trip delay between each outstation and the head end is substantially the same, the program being arranged to perform the steps of:

scheduling timeslots for each outstation without allocating a guard band between consecutive first and second timeslots.

The invention also provides for a method of allocating timeslots in a communications network comprising a head end, a plurality of outstations, and a shared medium connecting each outstation to the head end, roundtrip delay between the head end and each outstation being substantially the same, the method comprising the steps of: allocating a first timeslot to a first outstation; allocating no guard band; allocating a second timeslot to a second outstation.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Gigabit Ethernet PONS have been proposed as a means of cost effectively providing fibre access to homes and businesses. Current techniques include a GEPON based on very simple protocols which trade off bandwidth for latency and limited fibre deployment rules, and significantly complex Ethernet PONs with complex marshalling systems for outstation management.

The present invention provides a simple PON ranging protocol which eliminates these trade-offs and allows GEPONs with large numbers of outstations (e.g. 256 vs currently 16) to be achieved, while simultaneously eliminating differential distance limitations, all at high bandwidth efficiencies.

This ranging technique will be of particular value for PONs above 1 Gbps and/or 32 way splits.

This optical aggregation of traffic from smaller businesses will be of increasing importance as optical switching and multiplexing of wavelengths becomes more widespread.

The invention relates in particular to the implementation of point-to-multipoint communications systems. An important example of these is a passive optical network (PON). A particular system in conjunction with which the present invention could be applied is disclosed in co-pending patent application entitled "Multiple Access System for Communications Network" filed Mar. 12, 2001 (as a Continuation-in-Part of earlier application U.S. Ser. No. 09/584,331 "Multiple Access System for Communications Network" filed May 30, 2000), and the contents of which is included herewith as Annex 1. That application discloses how timeslots may be notified to outstations under headend control by sending messages firstly to silence a first transmitting outstation and then to permit a further outstation to begin transmission.

Figure 1:
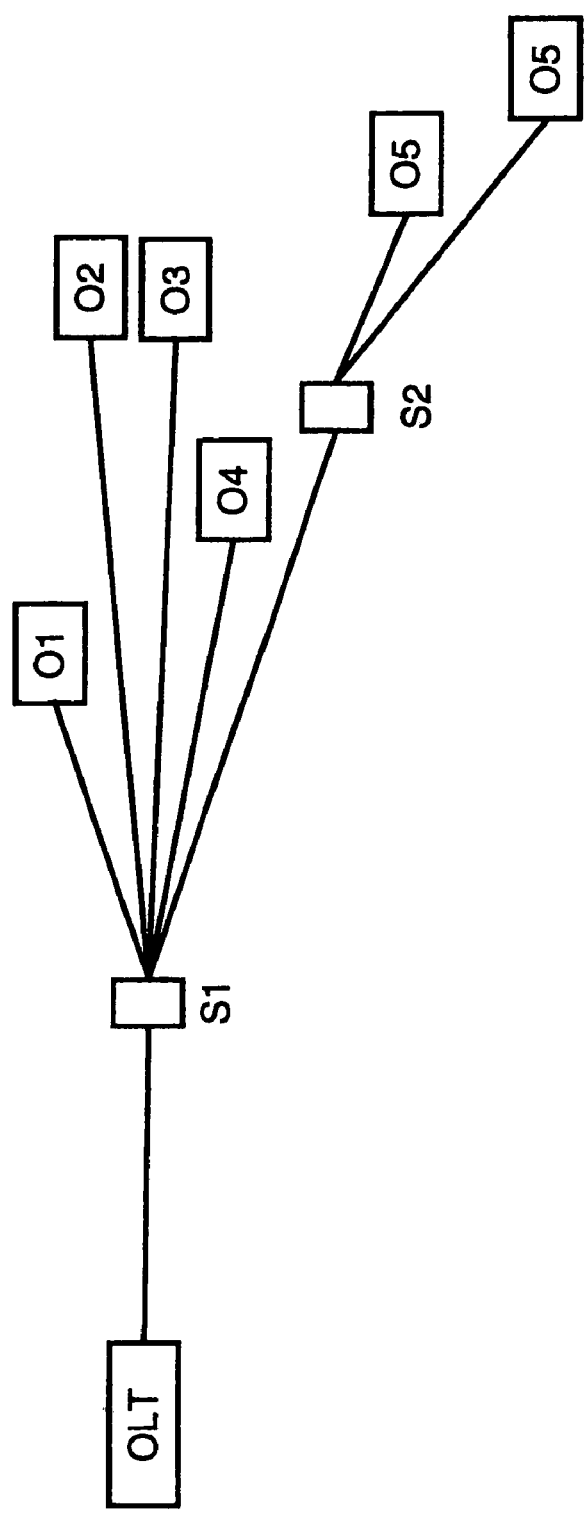
FIG. 1 shows a schematic diagram of an optical access network in accordance with the present invention.

Referring to FIG. 1, there is shown a typical access network configuration in accordance with the present invention: a single headend (in this case an Optical Line Termination Unit (OLT), but more generally a Line Termination Unit (LTU)) connected via a shared medium to a plurality of outstations O1–O6. In the example shown the shared medium is provided by optical fibres connecting the OLT to a first splitter S1 (ideally a passive splitter) from which multiple fibre lengths connect to the outstations O1–O4). One fibre length connects to a further splitter S2 which provides connection via further fibre lengths to outstations O5–O6.

Communication in the downstream direction is physically multicast in nature—signals sent from the headend are received by all connected outstations—though individual frames may be addressed to specific outstations or themselves be directed to multicast addresses.

Communication in the upstream direction shares the medium between the various outstations on a timeslot basis. Outstations are allocated timeslots in order to avoid collision in the upstream path, resulting in frame data loss and retransmission delay.

Fibre based access networks intended for delivery of high bandwidth services to end customers can be based on so-called Passive Optical Networks (PONs). In a PON a head end OLT, which is typically located at the network operator's local point of presence, is connected to a number of outstations O5–O6 via a fibre network. A single fibre connection links the head end to a passive optical splitter S1 which divides the optical power (typically, but not necessarily) equally between a number of fibres, each of which terminates at an outstation. Signals sent downstream from the head end arrive at a reduced power level at all outstations unless the signals are amplified in transit. Each outstation converts the optical signal to an electrical signal and decodes the information. The information includes addressing information which identifies which components of the information flow are intended for a particular outstation. In the upstream direction, each outstation is allocated a time interval during which it is permitted to impress an optical signal on the upstream fibre. The fibres from all outstations are combined at the optical splitter and pass over the common fibre link to the head end. Signals sourced from any outstation propagate only to the head end. The upstream network may use separate fibre links and splitter, or may use the same network as the downstream direction but using a different optical wavelength. For Asynchronous Transfer Mode (ATM) PONS, protocol for organising traffic to and from each outstation, known as the Full Services Access Network (FSAN) protocol, has been standardised.

Typically, the propagation delay associated with the optical paths between the head end and each outstation will differ. To prevent collisions on the upstream path, the protocol must allow for this. Known protocols have achieved this either by creating a guard band between transmission opportunities for different outstations, or by causing each outstation to build out the optical path delay to a common value by adding delay in the electrical domain. The latter approach, often referred to as 'ranging' is more efficient, especially where the unit of transmission time for each outstation is small; this is the approach adopted by FSAN.

FSAN is a relatively complex protocol, requiring large scale integrated circuit technology in a practical system. Such circuits are specialised for the PON application and are therefore relatively costly because of the relatively small volumes used. The present invention provides an alternative system for improving the efficiency of upstream transmission without introducing the complexity of a full ranging protocol, in particular by eliminating the need for logic at the outstations to build out the optical path delay to a common value.

Though described here in terms of optical networks, the invention can clearly also be applied to other point to multipoint networks, including wireless networks.

The operation of the ranging subsystem is described below by following an example where a new outstation is to be included in a polling cycle which already contains a number of existing outstations.

First, the distance of the new outstation from the head end must be established. This can be done, for example, by physical measurement (from the field installation or from a map of the installation), or using electronic means, such as the method described in the following paragraph. The units of measurement are arbitrary.

Electronic measurement of the outstation distance is already used in other PON protocols, such as FSAN. The description here covers one possible, and particularly simple, way of achieving this. During the polling cycle, a ranging window is introduced. During this window, only the outstation whose distance is to be measured is allowed to transmit in the upstream direction. Transmission from this outstation is initiated by sending a polling frame from the head end. When a polling frame is transmitted during the ranging window a signal generated in the MAC logic is used to start a counter. The counter counts clock pulses generated by a clock source. The exact speed of the clock source is unimportant save that the clock frequency should be high enough to measure the time delay to a sufficient level of accuracy, but not so high as to cause the counter to overflow during the counting interval. The polling frame propagates to the outstation whose address is contained in the address field of the polling frame. During this time the counter continues to count clock pulses. On receipt of the polling frame the selected outstation transmits onto the upstream medium any frame it has queued in its internal buffers. This frame propagates back to the head end. On receipt of a frame, the head end MAC logic generates a second signal to stop the counter. The value in the counter then represents the distance for Asynchronous Transfer Mode (ATM) PONS, from the head end to the outstation in some arbitrary unit of measurement. This value is transferred to a memory and associated with its corresponding outstation. Clearly, the ranging window must be long enough to allow the downstream signal and the reply to propagate to the furthest possible outstation distance and back. In this case, then, "distance" is measured as the round trip time delay, and one outstation is closer to the head end then another if its round-trip delay is shorter.

To allow for the possibility of transient delay in any specific measurement, multiple measurements may be made, either within one time slot or over a number of cycles. The minimum distance measured may be used as the best estimate.

Once an association is made between an outstation and its distance from the head end, the new outstation can be included in the normal polling cycle.

Other outstations, which are already included in the polling cycle, will already have an associated distance measurement.

In the most preferred embodiment, the protocol compares the distance measurement obtained for the new outstation with measurements for existing outstations and inserts the new outstation in the polling sequence such that the distance measurements increase numerically with the position of the outstation in the list. Thus, the outstation which is closest to the head end is polled first and the outstation which is furthest away is polled last in the sequence, with other outstations inserted in increasing order of distance in between.

During the polling cycle, it is now guaranteed that the next outstation in the sequence can be no closer to the head end than the currently active outstation. Thus, when transferring control from one outstation to the next, no guard band component need be inserted to allow for differential distance between outstations. Note, though, that other considerations in the protocol (such as the time taken for head end components to adapt to the new optical operating parameters of the new outstation) may require separate components in the guard band. Optionally, a small component may be inserted in the guard band to allow for errors and drift in distance measurements.

When the last outstation has been polled, a longer guard band must be included since the next outstation to be polled will be closer to the head end. Note, though, that this guard band is included only once during the polling sequence, rather than between each outstation as required on a non-ranged system.

By way of example, we consider a system containing 64 outstations with a 20 km reach. Further, we assume that a minimum guard band of 20 microseconds must be included between outstations to allow for nondistance-related considerations.

In a non-ranged PON an additional 200 microseconds must be included in the guard band between consecutive outstations to allow for a possible 20 km offset. Total guard time is then 64×(200+20)=14 milliseconds. For an overall efficiency of 80%, total polling cycle time is 70 milliseconds.

In a PON based on the present invention, a ranging window of 200 microseconds is required in addition to a single 20 km window to account for the 20 km reach (i.e. a further 200 microseconds) (that is, the single guard band between last and first slot in the cycle). Total guard time is then 400+64×20=1.7 milliseconds. Now, for a 80% efficiency, total polling cycle time falls to 8.4 milliseconds.

In other embodiments, in which outstations are not placed in the polling cycle in strictly ascending order of distance from the headend, advantage may still be gained by observing that where an outstation to be allocated a timeslot is no closer than the outstation allocated the immediately preceding timeslot , no guard band is necessary. This allows polling to take place in arbitrary order, whilst still minimising use of guard bands.

According to the methods described in Annex 1, notification to each outstation of permission to transmit is effected by firstly sending a message to the currently transmitting outstation to cease transmission, followed by a message to the next outstation that it may now transmit. By combining that method with the present methods, which reduces guard band requirements, it is also possible in some arrangements that the order of the cease transmission and begin transmission messages may be reversed. In particular this may be effected where the next outstation to be allocated a timeslot is sufficiently further away from the currently transmitting outstation that, even though it were to begin transmission before the currently transmitting outstation has ceased, nevertheless the currently transmitting outstation will have ceased sending data upstream over that part of the medium shared by the two outstations before transmission from the next outstation reaches the shared portion of the medium.

Figure 2:
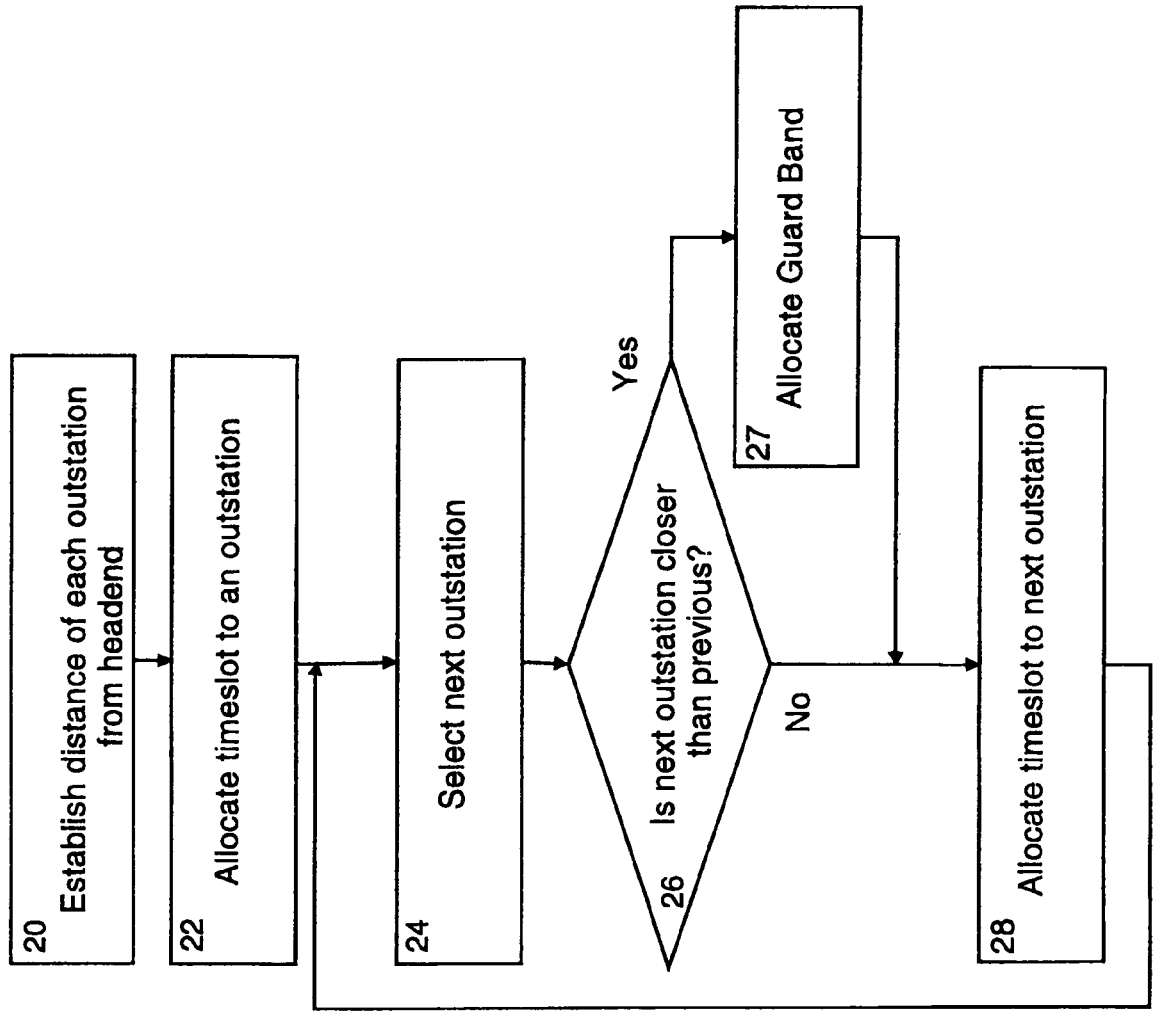
FIG. 2 shows a flow diagram of a first time slot allocation method in accordance with the present invention.
Figure 3:
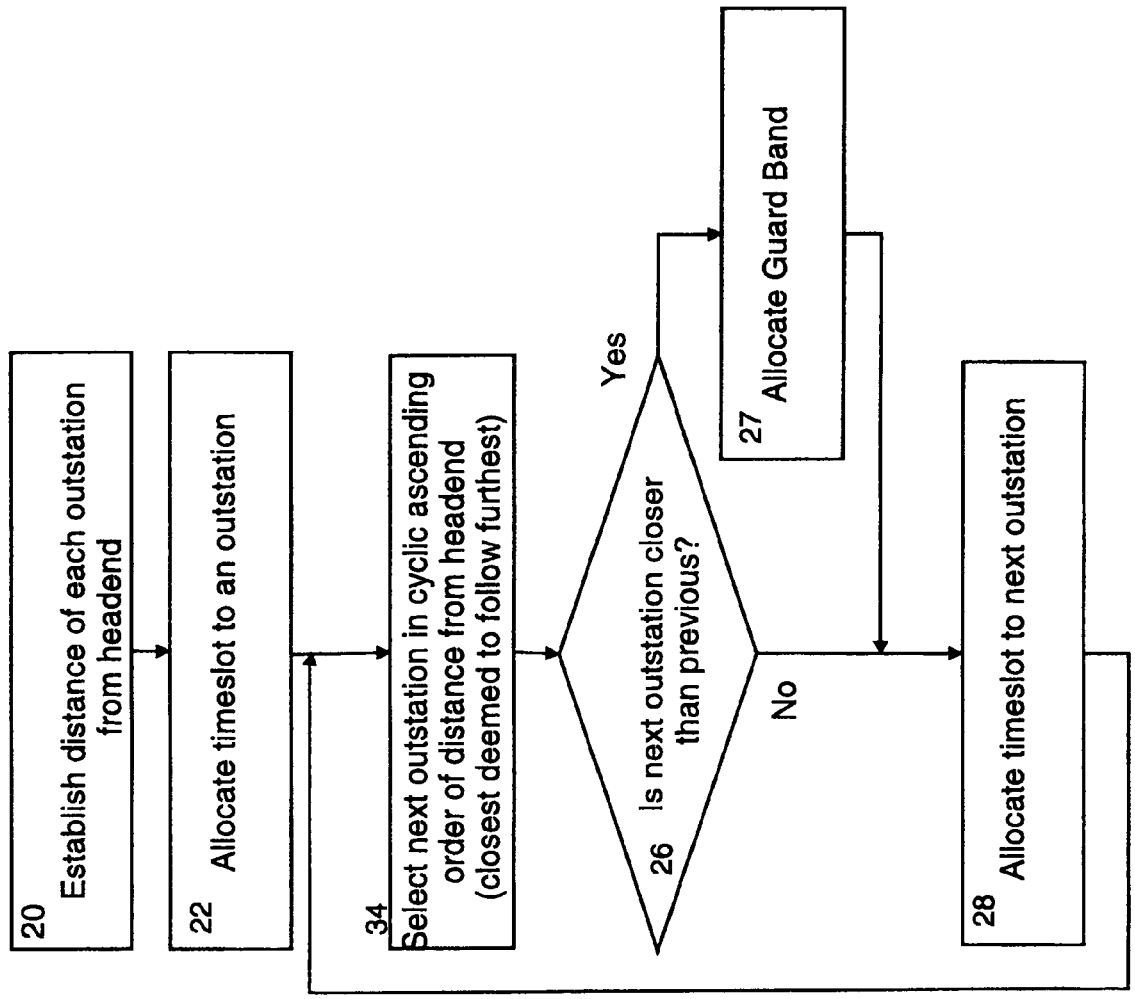
FIG. 3 shows a flow diagram of a second time slot allocation method in accordance with the present invention.

Referring now to FIGS. 2 and 3, other methods are shown in accordance with the present invention. In particular FIG. 2 illustrates a method of scheduling timeslots in which the distance of each outstation from the head end is established 20.

A timeslot is then allocated 22 to one of the outstations. The next outstation to be allocated a time slot may now be selected 24. This may be any outstation, though in any specific implementation specific local selection criteria may be applied. If the selected outstation is closer to the head end then the outstation previously allocated a timeslot 26 then a guard band is allocated 27 (otherwise there is no need to allocate a guard band). The next timeslot is then allocated 28 to the chosen next outstation. In this way guard bands are allocated only where the next outstation is closer to the head end then the outstation allocated the preceding time slot. Which reduces the potential upstream band width required for guard bands.

FIG. 3 shows a particularly preferred embodiment of the method of FIG. 2 in which, successive outstations are selected to minimise the number of guard bands required. Outstations are selected 34 in cyclic ascending order of distance from the head end, with the closest outstation following the furthest to complete the cycle. In this arrangement, a guard band is required 27 only between the timeslots allocated to the furthest and the closest outstations.

Note that in practice it is the decision as to whether a guard band is required depends on the relative distances between each outstations and the head end rather then absolute distance: i.e. whether the next outstation is merely closer or further away then the previously selected outstation.

Figure 4A:
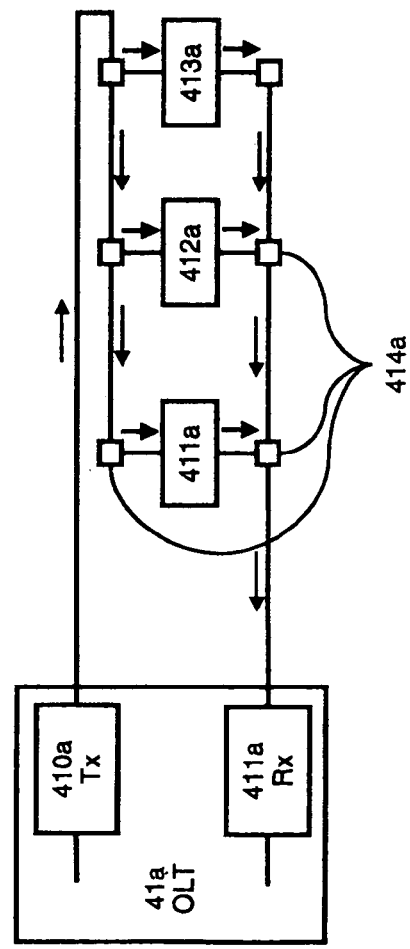
FIGS. 4(a) and 4(d) show schematic diagrams of further access networks in accordance with the present invention.
Figure 4B:
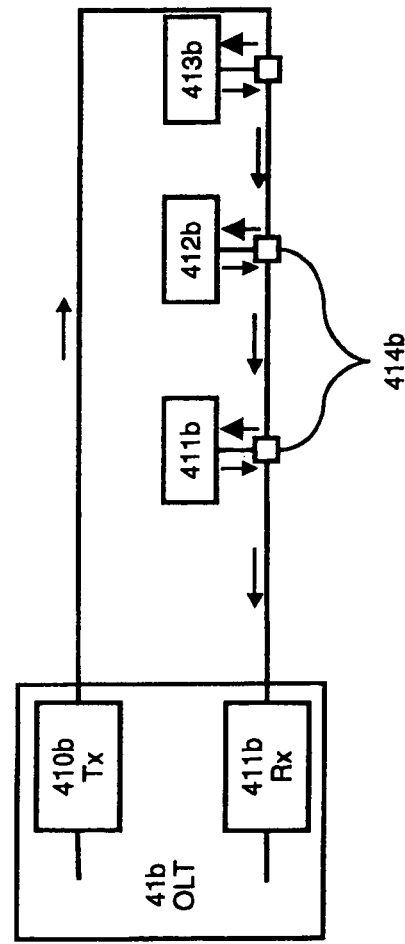

Referring now to FIGS. 4(*a*) and 4(*b*) these are shown two particularly preferred embodiments of the present invention in which the point-to-multipoint network is arranged as a loop. From OLT 41*a* transmitter 410*a*, 410*b* to OLT receiver 411*a*, 411*b*.

In FIG. 4(*a*) separate paths are provided downstream for OLT transmitter 410*a* to the outstations 411*a*–413*a* and upstream from the outstation to the OLT receiver 411*a*. Downstream traffic is distributed to the Outstations and upstream traffic combined by means of one or more taps 414*a*.

The arrangement has the specific benefit that the round-trip delay for OLT transmitter to OLT receiver is substantially the same for all Outstations on the network. Consequently, so far as ranging is concerned, each outstation is at least as far from the OLT as each other. Therefore in whichever order upstream timeslots are allocated to outstations, no guard band need be allocated to allow for differential distance between outstations.

In FIG. 4(*b*) a logically similar arrangement is shown, but in this embodiment a single optical path is shared for both upstream and downstream traffic. In such a physical arrangement, downstream and upstream traffic would employ distinct wavelengths, whilst in the arrangement of FIG. 4(*a*), the same wavelength could be used for both upstream and downstream traffic.

Specifically, in the example illustrated, downstream traffic from the OLT 41*b* transmitter 410*b* is distributed to the outstations 411*b*–413*b* via one or more taps 414*b*. Upstream traffic to the OLT receiver 411*b* similarly is combined onto the shared fibre by the same, or a similar, tap arrangement.

Where the round-trip delay for all outstations is essentially the same, no ranging procedure need be performed, nor any "range" checks on which outstation may be allocated the next timeslot without first inserting a guard band.

In situations in which a network operator might not be assured that the round trip delays are sufficiently equal, it may still be desirable to perform the ranging checks and, if needed, allocate timeslots according to roundtrip distance form the OLT as in the basic method described above.

This invention in conjunction with, for example, the time slot allocated protocols of co-pending application U.S. Ser. No. 09/804,316 "Multiple Access System for Communications Networks" the content of which is included in Annex 1 can be used over rings of arbitrary length, where upstream and downstream traffic travel in the same direction around the ring. In the prior art, the guard band required is related to the differential distance to the head end, and hence the efficiency is radically reduced for distances in excess of 5–10 km, which is less than many metro rings. By using the same direction for both its downstream slot-allocation control messages and the resulting upstream traffic, the length of the rings does not contribute to the length of the guard band. Calculations show that a ring PON with six outstations and a length of greater than 20 km is achievable without amplification. Addition of amplification would extend both the ring length and the number of nodes which can be served. In such an arrangement wave division multiplexing (WDM) could be used to separate downstream traffic from upstream traffic. For example downstream traffic could be transmitted at 1300 nm whilst upstream traffic could use 1550 nm, though clearly other combinations are possible. Nor is the invention limited to use of a single wavelength for each of downstream and upstream traffic.

Any range or device value given herein may be extended or altered without losing the effect sought, as will be apparent to the skilled person for an understanding of the teachings herein.

The invention claimed is:

1. A method of allocating guard bands between time slots in a communications network comprising a headend, a plurality of outstations, and a shared medium connecting each outstation to the headend, the method comprising the steps of:
    establishing measures of distance of each outstation from the headend;
    allocating a guard band between successive first and second timeslots allocated to the outstations only where the outstation allocated the second timeslot is closer to the head end than the outstation allocated the first timeslot.

2. A method according to claim 1 in which the measure of distance is a measure of round-trip delay between headend and outstation.

3. A method according to claim 1 additionally comprising the step of:
    scheduling timeslots for the outstations responsive to the measures of distance.

4. A method according to claim 3 wherein the step of scheduling comprises the step of:
    scheduling the timeslots to outstations cyclically in ascending order of distance of the outstations from the headend.

5. A method according to claim 1 wherein the step of establishing comprises the steps of:
    for each outstation forming a measure of the time interval between the headend issuing an interrogation and the headend receiving a response from that outstation;
    for each outstation, forming the measures of the distance responsive to the intervals.

6. A method according to claim 1 wherein the step of establishing comprises the steps of:
    for each outstation, measuring the intervals between sending at least one interrogation message from the headend to the outstation and receiving respective replies from the outstation;
    for each outstation, forming the measures of the distance responsive to the respective minima of the intervals.

7. A method according to claim 1 in which a timeslot is periodically allocated for purposes of re-establishing the measures of distance of each outstation from the head end.

8. A method according to claim 1 wherein the shared medium is one of an optical fibre medium, a copper medium, and a wireless medium.

9. A method according to claim 1 in which all outstations are substantially equidistant from the head end.

10. A method according to claim 1 in which the head end, shared medium, and outstations are configured as a loop.

11. A method according to claim 10 in which separate shared media are provided for upstream and downstream communication between the head end and the outstations.

12. A method according to claim 1 in which the outstations and head end are configured in a ring network, in which differential distance between each outstation and the headend is substantially eliminated by causing both downstream and upstream traffic to travel around the ring in the same direction.

13. A Method according to claim 1 in which the step of establishing measures is performed prior to installation of the network.

14. A method according to claim 3 in which the step of scheduling timeslots comprises the step of scheduling timeslots according to demand.

15. A line termination unit for a telecommunication network comprising a plurality of outstations and a shared medium connecting each outstation to the headend, the line termination unit comprising:
    a guard band allocator arranged to allocate guard bands between successive first and second timeslots allocated to the outstations only where the outstation allocated the second timeslot is closer to the head end then the outstation allocated the first timeslot
    a timeslot scheduler arranged to schedule timeslots for each outstation responsive to measures of distance of each outstation from the headend.

16. A line terminating unit according to claim 15 additionally comprising:
a timeslot scheduler arranged to schedule timeslots for each outstation responsive to measures of distance of each outstation from the headend.

17. A line terminating unit according to claim 16 additionally comprising:
a ranging system arranged to derive the measures of distance of each outstation from the head end.

18. A line termination unit according to claim 15 in which the scheduler is arranged to schedule timeslots to outstations cyclically in ascending order of distance of the outstations from the headend.

19. A line termination unit according to claim 15 in which the shared medium is one of an optical medium, a copper medium, and a wireless medium.

20. A communications network comprising a line termination unit according to claim 15.

21. A communications access network comprising a line termination unit according to claim 15.

22. A communications network according to claim 20 further comprising:
at least one outstation,
the line terminating unit and the at least one outstation being configured to form a ring network.

23. A communications network according to claim 22 being an optical communications network.

24. A communications network according to claim 23 in which wave division multiplexing is employed to separate upstream and downstream traffic.

25. A program for a computer stored on a computer readable medium, for allocating guard bands between time slots in a communications network, comprising a headend, a plurality of outstations, and a shared medium connecting each outstation to the headend, the program being arranged to perform the steps of:
storing measures of distance of each outstation from the headend;
allocating a guard band between successive first and second timeslots allocated to the outstations only where the outstation allocated the second timeslot is closer to the head end than the outstation allocated the first timeslot.

* * * * *